May 7, 1957 F. L. GRANT 2,791,475
SEALING CUP
Filed April 11, 1955
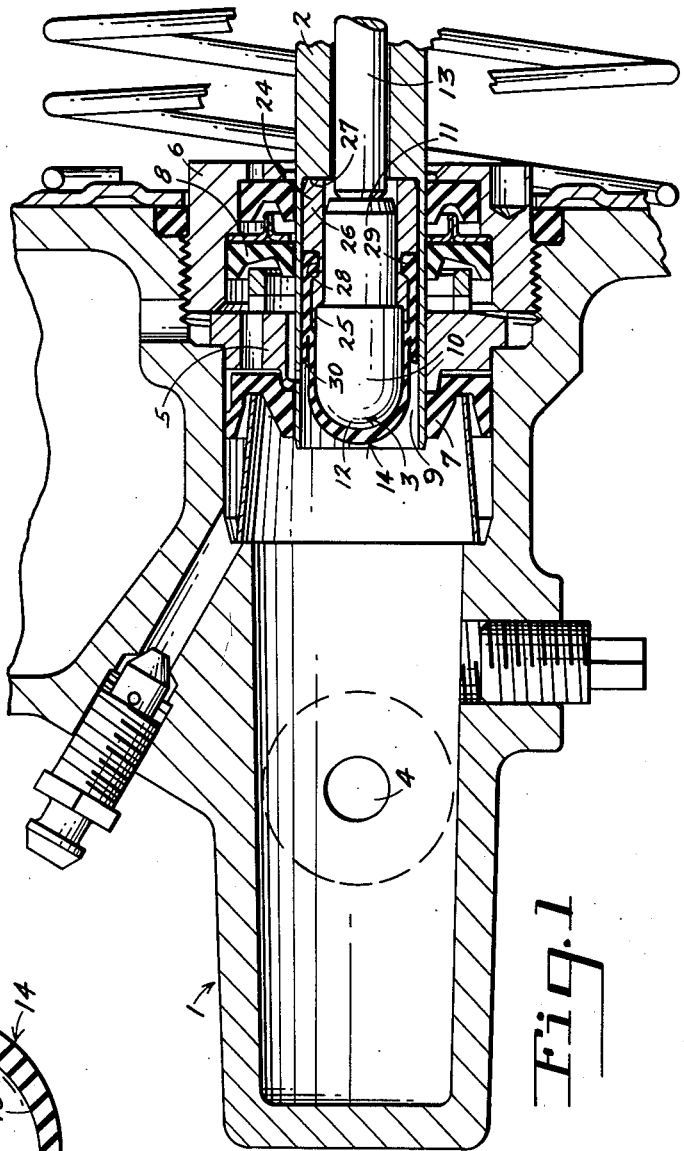
INVENTOR.
FRANK L. GRANT.
BY

United States Patent Office 2,791,475
Patented May 7, 1957

2,791,475

SEALING CUP

Frank L. Grant, Birmingham, Mich., assignor to Kelsey-Hayes Company, a corporation of Delaware Application April 11, 1955, Serial No. 500,375

6 Claims. (Cl. 309—1)

The invention relates to sealing cups and refers more particularly to flexible sealing cups for use in hydraulic mechanisms.

The invention has for one of its objects the provision of an improved flexible sealing cup constructed to maintain an effective seal and have long life.

The invention has for another object to provide a flexible sealing cup for sealing the space between outer and inner members, the sealing cup having a dome extending over an end of the inner member, two side wall portions of different diameters, one portion engaging the inner member and the other portion engaging the outer member and an annular lip encircling the smaller diameter wall portion and engaging the outer member.

The invention has for a further object to provide the sealing cup with another side wall portion between the side wall portions of different diameters and having a frusto-conical flared end surface connecting into the inner surface of the larger diameter side wall portion to increase the cup life.

Other objects of the invention will become more fully apparent from the following description taken in connection with the accompanying drawings in which—

Figure 1 is a longitudinal section of a portion of a hydraulic mechanism showing the sealing cup embodying the invention;

Figure 2 is a longitudinal section of the sealing cup in its natural state.

As illustrated in Figure 1 the hydraulic mechanism is a fluid pressure producing device and more particularly a hydraulic pressure producing device having the hydraulic cylinder 1 and the concentric outer and inner members 2 and 3 respectively which extend into the cylinder. Both members are adapted to be moved forwardly in unison to produce or create pressure in the cylinder and force liquid from the cylinder through its outlet port 4. The inner member is movable axially relative to the outer member to a slight extent.

The outer member 2 is a cylindrical tubular plunger slidable in the bearing 5 secured within the cylinder 1 by the externally threaded fitting 6. Suitable sealing means 7 and 8 are provided between the cylinder and the plunger and the fitting and the plunger. The inner member 3 is a cylindrical reaction piston located within the enlarged cylindrical recess 9 in the end portion of the plunger and subject to the pressure of the liquid in the cylinder by reason of the end of the plunger in the cylinder being open. The piston has the front and rear cylindrical portions 10 and 11 respectively with the front portion formed with the convex hemispherical front end or nose 12. The rear portion 11 is of smaller diameter than the front portion 10 and abuts the reaction rod 13 which is freely slidable longitudinally in the plunger 2.

For the purpose of sealing the space between the plunger 2 and the reaction piston 3 and at the same time providing for slight relative axial movement of the reaction piston relative to the plunger, there is the flexible sealing cup 14. This sealing cup is preferably formed of rubber and has the dome 15 formed with the arcuate or hemispherical inner and outer surfaces 16 and 17 respectively of different radii and with the different centers 18 and 19. The inner surface is adapted to extend over the front end or nose 12 of the reaction piston with slight clearance between the dome and the front end or nose. The sealing cup also has a side wall with the front and rear cylindrical portions 20 and 21 respectively and the intermediate cylindrical portion 22. The inner and outer surfaces of the front portion 20 are tangent to the inner and outer surfaces 16 and 17 respectively and the inner surface of the front portion encircles the front portion 10 of the reaction piston. The inner and outer surfaces of the rear portion 21 are of greater diameter than the inner and outer surfaces respectively of the front portion 20 and the outer surface of the rear portion extends within the cylindrical surface of the wall of the plunger forming the recess 9. The inner and outer surfaces of the intermediate portion 22 are of the same diameters respectively as the inner and outer surfaces of the front and rear portions 20 and 21 respectively. The inner surfaces of the intermediate and rear portions are joined by a frusto-conical flared end surface 23 at the rear end of the intermediate portion to increase the life of the cup. To secure the sealing cup in place, there is the intermediate member or insert 24 having the front and rear portions 25 and 26 respectively. The rear portion 26 has a sliding fit with the cylindrical wall forming the recess 9 and with the rear portion 11 of the reaction piston and the front portion has a sliding fit with the front portion 10 of the reaction piston. The rear portion of the insert abuts the bottom 27 of the recess 9 and has the annular groove 28 for receiving the internal annular bead 29 formed at the rear end of the sealing cup. The rear portion 11 of the reaction piston is spaced forwardly of the bottom 27 of the recess, the annular shoulder between the front and rear portions 10 and 11 of the reaction piston is spaced forwardly of the annual shoulder between the front and rear portions 25 and 26 of the insert and the flared end surface 23 of the sealing cup is spaced forwardly of the insert so that the reaction piston is free to move axially rearwardly relative to the plunger under the influence of the liquid in the cylinder 1 when pressure is produced in the cylinder.

To form an effective seal, the sealing cup is provided with the annular lip 30 extending forwardly from the intermediate portion 22 and encircling the front portion 20 and firmly engaging the cylindrical wall of the plunger forming the recess 9. The sealing cup in its natural condition, as illustrated in Figure 2, has its annular bead 29 rounded with an inner diameter which is less than the outer diameter of the bottom of the groove 28 of the insert 24. In the assembled condition, as illustrated in Figure 1, the diameter of the bead is increased and the bead is flattened and held firmly in the groove by the cylindrical wall of the plunger with the major portion of the outer surface of the rear portion 21 slightly clearing the cylindrical wall. Also in the natural condition of the sealing cup its annular lip 30 is flared outwardly and forwardly at an obtuse angle and has maximum diameter which is appreciably greater than the internal diameter of the cylindrical surface of the plunger so that when the sealing cup is in assembled relation to the plunger and reaction piston the annular lip engages the cylindrical wall with sufficient pressure to form an effective seal.

To assemble, the reaction piston 3 is preferably coated with a lubricant and then the insert 24 and the sealing cup 14 are moved over the piston and the bead 29 engaged in the groove 28. The unit formed by the piston, insert and cup is then inserted into the recess 9 of the plunger 2 with the insert against the bottom 27 of the recess. During this step the bead 29 is flattened by the cylindrical wall of the recess. When the pressure exerted during the insertion is released, the reaction rod 13, which is normally held in forward position by a relatively weak spring, moves the piston forwardly to normal position with its shoulder between the front and rear portions 10 and 11 spaced forwardly of the shoulder between the front and rear portions 25 and 26 of the insert and the flared end surface 23 of the cup spaced forwardly of the insert.

What I claim as my invention is:

1. A sealing cup for use with an outer cylindrical member and an inner cylindrical member spaced from said outer cylindrical member and having a convex end, said cup having a dome extending over said convex end, a cylindrical side wall portion encircling said inner member, an annular, radially outwardly extending lip engaging said outer member and an annular, radially inwardly projecting bead clamped in place by said outer member in relation to said inner member.

2. A sealing cup for use with an outer cylindrical member, an inner cylindrical member spaced from said outer cylindrical member and having a convex end and an intermediate cylindrical member engaging both said outer and inner members at the end of said inner member spaced from said convex end, said cup having a dome extending over said convex end, a cylindrical side wall portion encircling said inner member and spaced from said outer member, a second cylindrical side wall portion extending within said outer member and having a bead radially inwardly engaging said intermediate member, and an annular lip radially outwardly engaging said outer member.

3. A sealing cup having a dome with hemispherical inner and outer surfaces of different radii and of different centers, a side wall having a cylindrical portion with inner and outer surfaces tangent to said hemispherical inner and outer surfaces, a second cylindrical portion having inner and outer surfaces of greater diameters than said inner and outer surfaces respectively of said first mentioned cylindrical portion and an intermedite cylindrical portion having inner and outer surfaces of the same diameters at the inner and outer surfaces respectively of said first mentioned and second cylindrical portions, and an annular flared lip extending from said intermediate cylindrical portion with its outer surface normally making an obtuse angle with said outer surface of said intermediate cylindrical portion.

4. A sealing cup having a dome with hemispherical inner and outer surfaces of different radii, a cylindrical wall having one portion with inner and outer surfaces tangent to said dome inner and outer surfaces, a second portion with inner and outer surfaces of greater diameter than said inner and outer surfaces respectively of said first mentioned portion, a third portion between said first mentioned and second portions with an inner surface of the same diameter as said inner surface of said first mentioned portion and an outer surface of the same diameter as said outer surface of said second portion, said third portion having a frusto-conical flared end surface connecting into the inner surface of said second portion, and an annular lip extending from said third portion and encircling said first mentioned portion.

5. A sealing cup for use with an outer cylindrical member, an inner cylindrical member spaced from said outer cylindrical member and having a hemispherical end and an intermediate cylindrical member engaging both said outer and inner members at the end of said inner member spaced from said hemispherical end, said cup having a dome extending over said hemispherical end, a cylindrical side wall portion encircling said inner member and spaced from said outer member, a second cylindrical side wall portion extending within said outer member and having a bead radially inwardly engaging said intermediate member, and an annular lip encircling said first mentioned side wall portion and radially outwardly engaging said outer member.

6. A sealing cup for use with a fluid pressure producing device having an outer tubular member provided with a cylindrical portion, an inner member within and spaced from said cylindrical portion and an intermediate member engaging said outer and inner members, said cup having a dome extending over an end of said inner member, a cylindrical side wall portion encircling said inner member and spaced from said outer member, a second cylindrical side wall portion extending within said outer member, an annular lip encircling said first mentioned side wall portion and radially outwardly engaging said outer member, and an annular bead on said second side wall portion radially inwardly engaging said intermediate member and flattened by said outer member.

References Cited in the file of this patent

UNITED STATES PATENTS

| | | |
|---|---|---|
| 2,140,778 | White | Dec. 20, 1938 |
| 2,192,012 | La Brie | Feb. 27, 1940 |
| 2,612,419 | Reynolds | Sept. 30, 1952 |